United States Patent
Vangala et al.

(10) Patent No.: US 8,837,474 B2
(45) Date of Patent: Sep. 16, 2014

(54) APPARATUS AND METHODS FOR EFFICIENT NETWORK ADDRESS TRANSLATION AND APPLICATION LEVEL GATEWAY PROCESSING

(75) Inventors: Venkata Satish Kumar Vangala, San Diego, CA (US); Alok Mitra, San Diego, CA (US); Rohit Tripathi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 80 days.

(21) Appl. No.: 13/330,529

(22) Filed: Dec. 19, 2011

(65) Prior Publication Data

US 2013/0156041 A1 Jun. 20, 2013

(51) Int. Cl.
*H04L 12/28* (2006.01)
*H04L 12/56* (2006.01)

(52) U.S. Cl.
USPC .......................................... 370/389; 370/401

(58) Field of Classification Search
None
See application file for complete search history.

(56) References Cited

U.S. PATENT DOCUMENTS

| | | | |
|---|---|---|---|
| 7,391,768 B1 * | 6/2008 | Samprathi et al. | 370/389 |
| 7,580,356 B1 * | 8/2009 | Mishra et al. | 370/230.1 |
| 8,509,148 B2 * | 8/2013 | Gleixner et al. | 370/328 |
| 2004/0223504 A1 * | 11/2004 | Wybenga et al. | 370/412 |
| 2005/0063398 A1 | 3/2005 | Choudhury et al. | |
| 2006/0233101 A1 * | 10/2006 | Luft et al. | 370/229 |
| 2008/0002579 A1 * | 1/2008 | Lindholm et al. | 370/230 |
| 2008/0008194 A1 * | 1/2008 | Goffin et al. | 370/401 |
| 2009/0067328 A1 | 3/2009 | Morris et al. | |
| 2009/0222577 A1 * | 9/2009 | Goodman et al. | 709/238 |
| 2010/0169636 A1 | 7/2010 | Davis et al. | |
| 2010/0172359 A1 * | 7/2010 | Pande et al. | 370/401 |
| 2011/0122880 A1 * | 5/2011 | Saito et al. | 370/401 |
| 2011/0131338 A1 * | 6/2011 | Hu | 709/229 |
| 2011/0182183 A1 | 7/2011 | Perkins | |
| 2011/0182290 A1 * | 7/2011 | Perkins | 370/389 |
| 2011/0191493 A1 | 8/2011 | Lee et al. | |
| 2013/0077491 A1 * | 3/2013 | Cherian et al. | 370/235 |

FOREIGN PATENT DOCUMENTS

| | | |
|---|---|---|
| CN | 1674565 A | 9/2005 |
| WO | 2006068548 A1 | 6/2006 |
| WO | WO2009024182 A1 | 2/2009 |

OTHER PUBLICATIONS

Partial International Search Report—PCT/US2012/070720—ISA/EPO—Mar. 28, 2013.

* cited by examiner

*Primary Examiner* — Warner Wong
(74) *Attorney, Agent, or Firm* — Abdollah Katbab

(57) ABSTRACT

Apparatus and methods for efficient NAT and ALG processing is disclosed. An exemplary method includes the operations of deep scanning a packet received over a connection to determine an application level gateway (ALG) process to be performed on the packet, associating the connection with the ALG process, and forwarding additional packets received over the connection to receive the ALG process based on said associating so that deep scanning of the additional packets is bypassed. An exemplary apparatus includes a processor to deep scan a packet received over a connection to determine an ALG process to be performed on the packet, a database to associate the connection with the ALG process, and a packet transmitter to forward additional packets received over the connection to receive the ALG process based on said associating so that deep scanning of the additional packets is bypassed.

24 Claims, 8 Drawing Sheets

APPARATUS AND METHODS FOR EFFICIENT NETWORK ADDRESS TRANSLATION AND APPLICATION LEVEL GATEWAY PROCESSING

BACKGROUND

1. Field

The present application relates generally to the operation of wireless communication systems, and more particularly, to efficient packet routing.

2. Background

Network address translation (NAT) is used to expand the usable address space of a network. In one implementation, a NAT module translates only the IP/transport header information of a data packet. This impacts applications which communicate network IP/port information to their peers in the data packet payload, as this information is not translated by the NAT module. This leads to dropped packet as the NAT module may reject the incoming packet connections on these IP/ports.

Application Level Gateways (ALGs) allow for application specific NAT traversal by translating the embedded IP/port information in the application payload to the NAT external IP/port. ALGs may interact with the NAT module to allow incoming data connections or perform other operations needed to make applications behind a NAT module communicate with peers in external realms.

Unfortunately, in conventional systems, ALGs are application specific and can introduce significant processing delays as they parse the application payload searching for embed IP/port information. These delays if introduced directly in the NAT processing path could impact all packet flows leading to undue increase in round trip times (RTTs), and as a consequence would also degrade the overall throughput. Additionally, wireless embedded devices (or mobile routers) are limited in CPU bandwidth, which implies that an increase in NAT processing would impact generic system performance. Furthermore, increased NAT processing due to ALG addition would also cause mobile routers to consume more power leading to quicker drainage of batteries and frequent recharging.

Therefore, it would be desirable to have a system that provides efficient NAT and ALG processing to overcome the problems associated with conventional systems as described above.

SUMMARY

In one or more exemplary embodiments, a system including apparatus and methods is provided for improving the efficiency of NAT-ALG processing in routers, for instance mobile routers. In an exemplary embodiment, a database is maintained that associates packets of a particular connection with selected ALG processing. As additional packets are received, the ALG processing required for each packet can be easily and quickly determined from the database, thus avoiding the need to deep scan each packet and lookup ALG rules to determine its ALG processing requirements. Each ALG process also includes its own input/output queues thus further increasing NAT processing efficiency.

In an aspect, a method is provided for packet routing that comprises deep scanning a packet received over a selected connection to determine a selected application level gateway (ALG) process to be performed on the packet, associating the selected connection with the selected ALG process, and forwarding additional packets received over the selected connection to receive the selected ALG process based on said associating so that deep scanning of the additional packets is bypassed.

In an aspect, an apparatus is provided for packet routing that comprises a processor configured to deep scan a packet received over a selected connection to determine a selected application level gateway (ALG) process to be performed on the packet, a database configured to associate the selected connection with the selected ALG process, and a packet transmitter configured to forward additional packets received over the selected connection to receive the selected ALG process based on said associating so that deep scanning of the additional packets is bypassed.

In an aspect, an apparatus is provided for packet routing that comprises means for deep scanning a packet received over a selected connection to determine a selected application level gateway (ALG) process to be performed on the packet, means for associating the selected connection with the selected ALG process, and means for forwarding additional packets received over the selected connection to receive the selected ALG process based on said associating so that deep scanning of the additional packets is bypassed.

In an aspect, a computer program product is provided for packet routing. The computer program produce comprises a non-transitory computer-readable medium embodying instructions executable by a processor to deep scan a packet received over a selected connection to determine a selected application level gateway (ALG) process to be performed on the packet, associate the selected connection with the selected ALG process, and forward additional packets received over the selected connection to receive the selected ALG process based on said associating so that deep scanning of the additional packets is bypassed.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes a system including apparatus and methods for improving the efficiency of NAT- ALG processing in routers, for instance mobile routers. The system is especially well suited for use with mobile devices, but may be used with any type of device operating as router.

Figure 1:
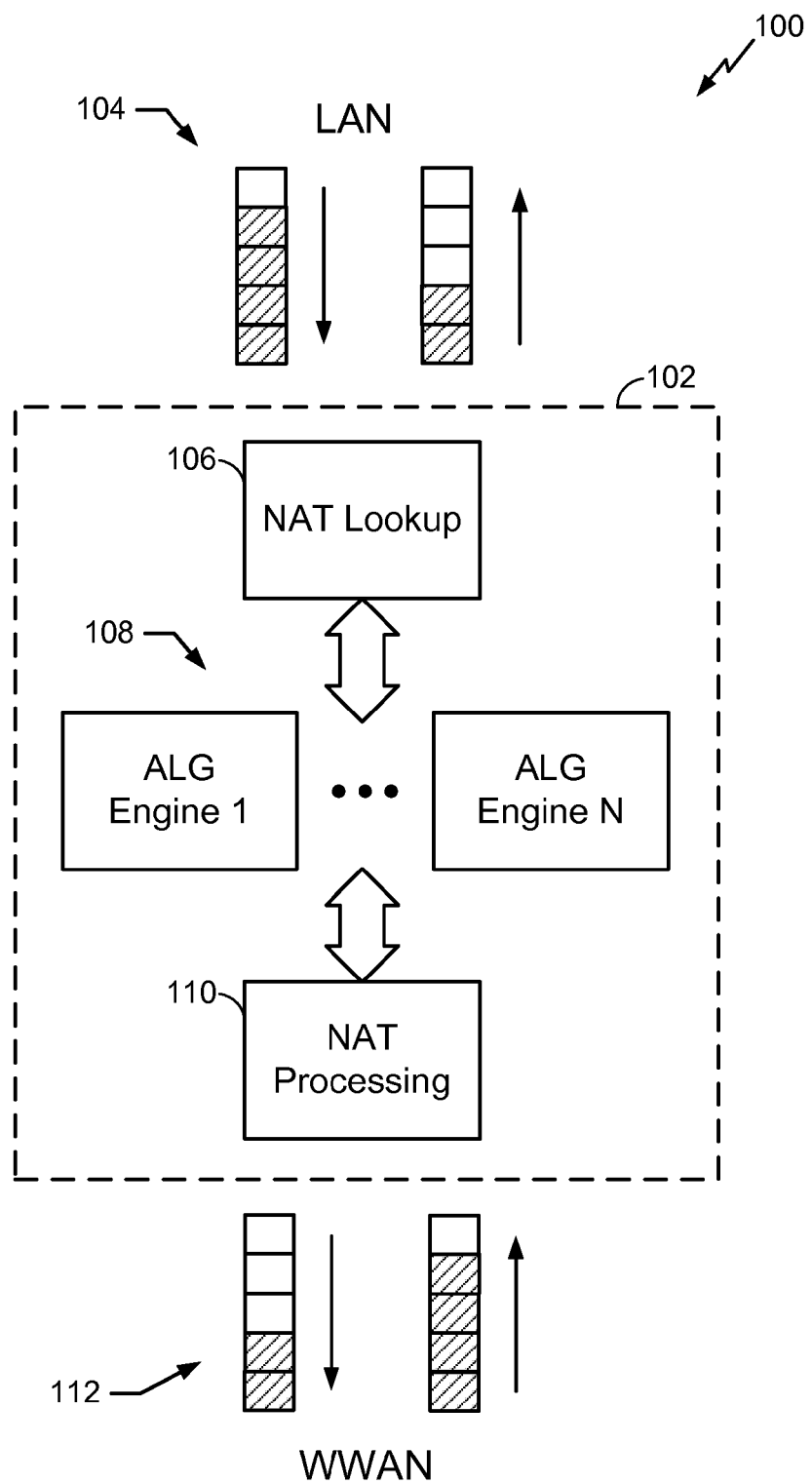
FIG. 1 shows a conventional NAT configuration for use in a router.

FIG. 1 shows a conventional NAT configuration 100 for use in a router. The configuration 100 comprises NAT apparatus 102 that receives and transmits packets over a local area network (LAN) connection 104. The NAT apparatus 102 comprises a NAT lookup module 106, one or more ALG engines 108, and a NAT processing module 110.

During operation, packets received from the LAN flow to the NAT lookup module 106 where the packets are scanned to determine which if any ALG processing is to be performed. For example, ALG processing operates to determine any application specification information from the payload of the packets that is to be used in routing the packets. After scanning, the packets are then passed to the appropriate ALG engine 108. After processing by the ALG engines 108, the packets flow to the NAT processing module 110 where destination routing addresses for the packets are determined. The packets are then transmitted to the destination addresses on a wide area network (WAN) connection 112. The process is reversed for packets traveling in the opposite direction.

The NAT configuration 100 illustrates a suboptimal configuration to perform ALG processing because the packets are processed directly in the NAT data path. The packets being processed by the ALG engines may cause delays in processing of other packets that are waiting in the incoming queue, which leads the incoming queues to build up, thus increasing the RTT of all packet flows. If the ALG processing task is not fast enough, queues can build up rapidly resulting in packet drops. For TCP connections, this translates into possible timeouts and back-offs and eventually lower throughput. The sustained synchronous processing also causes inefficient usage of the CPU, thus reducing idle time of the system and increasing battery drain.

Figure 2:
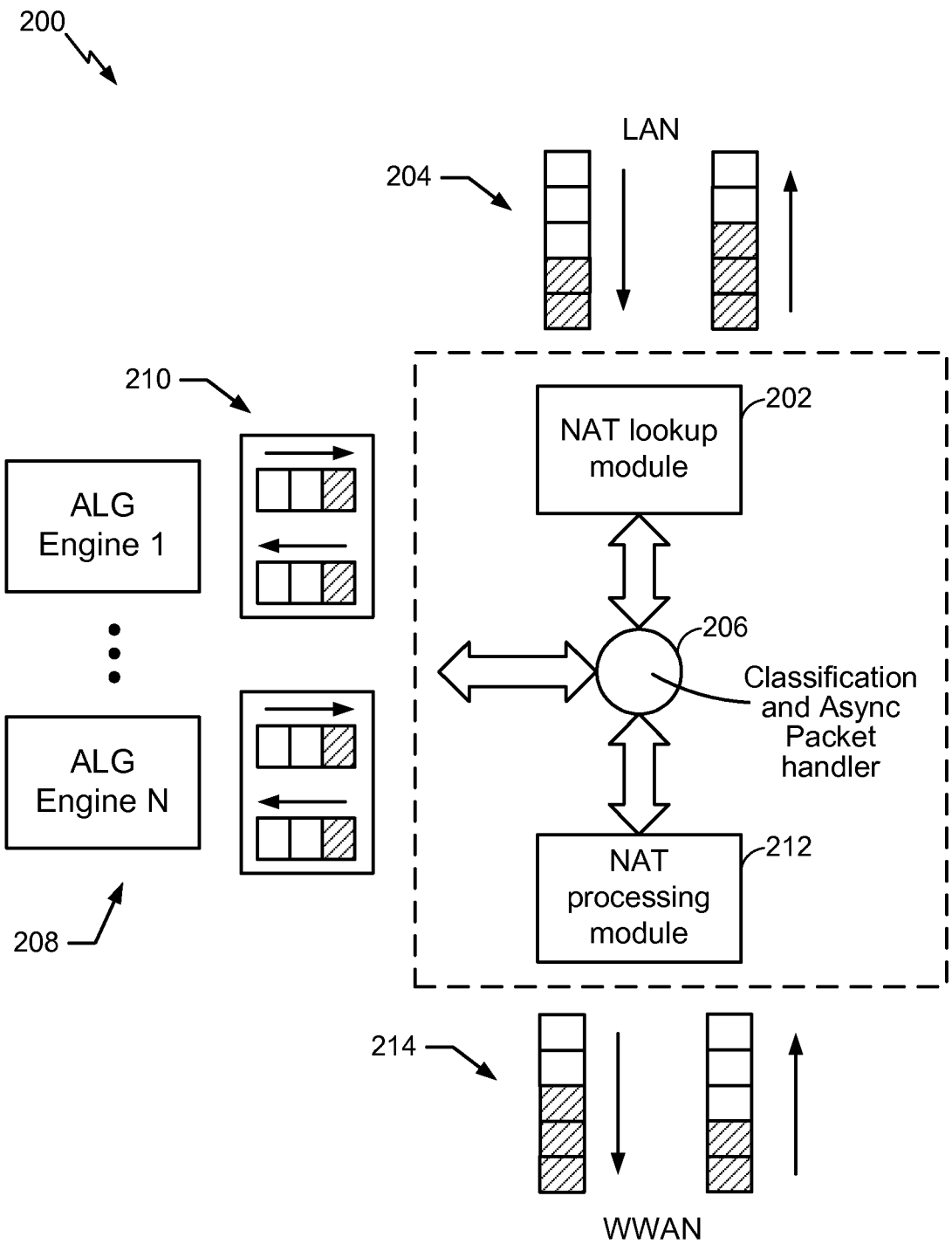
FIG. 2 shows an exemplary embodiment of an apparatus for efficient NAT and ALG processing.

FIG. 2 shows an exemplary embodiment of a system 200 for efficient NAT and ALG processing. In various implementations, the ALG processing can be symmetrically/asymmetrically placed for LAN and WWAN processing or for processing packets associated with any type of connection. The system 200 makes ALG processing asynchronous and performs at least the following four main functions.
1. Packet Lookup
2. Classification and Asynchronous Packet Handling
3. Payload Translation
4. Packet Routing The system 200 comprises a NAT lookup module 202, classification and asynchronous packet handler 206 (also referred to as "packet handler"), and NAT processing module 212. The system 200 also includes one or more ALG engines 208 and each ALG engine comprises an associated input/output queue 210.

The NAT lookup module 202 is initialized with rules as to how packets associated with specific applications are to be processed. For example, each ALG engine 208 provides rule information to the NAT lookup module 202 so that a Rule database can be maintained at the NAT lookup module 202. The Rule database comprises a set of rules that define various packet types, and each set of rules is associated with a corresponding ALG engine that is to be used to process the associated packet type. Any other input may be used to initialize, update, or maintain the Rule database, for instance, through user input or by using information received from other network entities.

The NAT lookup module 202 also comprises a Connection database. The Connection database associates packets of a particular connection with a particular ALG engine. This allows packets of a particular connection to be efficiently passed to the appropriate ALG engine without having to deep scan every packet associated with the connection.

During exemplary operation, the NAT lookup module 202 receives packets from a LAN 204 that are to be routed to a wireless WAN 214. The NAT lookup module 202 first determines if a received packet is associated with a connection that is already identified in the Connection database. If the packet is not associated with any connection identified in the Connection database, the packet is treated as the first packet of a new connection. Assuming that the packet is the first packet of a new connection, the packet is deep scanned to determine the ALG processing required for the packet. For example, during deep scanning the packet payload or any other packet information is scanned to determine information about the packet. The information obtained from deep scanning the packet is cross-referenced with the Rule database to determine the type of ALG processing required for the packet. The Connection database is then updated to associate packets of this particular connection with a particular ALG engine. The packet is tagged with information identifying the desired ALG processing and then passed to the packet handler 206 to perform the appropriate ALG processing.

As additional packets of the connection are received by the NAT lookup module 202, they are checked against the Connection database to determine the ALG engine to be used to process the packet. Each additional packet of the connection is tagged with information identifying the desired ALG processing determined from the Connection database. And the additional packets are then passed to the packet handler 206 to perform the appropriate ALG processing. Thus, once the Connection database is updated with information from the first packet of a particular connection, all other packets associated with that connection can be identified and passed to the packet handler 206 for appropriate ALG processing without the need to deep scan each additional packet. In some cases packets will not require any ALG processing and those packets will be tagged to indicate that no ALG processing is required and those packets will be pass to the NAT processing module for routing. Thus, the NAT lookup module 202 can receive packets from a variety of connections and can use the Connection database to efficiently route those packets to the appropriate ALG processing while bypassing the need to deep scan additional packets of each identified connection.

The packet handler 206 operates to coordinate the flow of packets to/from the ALG engines 208 and to the NAT processing module 212. The packet handler 206 receives packets destined for ALG processing and routes those packets to a particular queue 210 associated with the desired ALG processing engine 208. In an exemplary embodiment, input and output queues 210 are provided for each ALG engine. For example, each queue may be configured as first-in-first-out (FIFO) queue or any other type of suitable queue. The queues provide temporary storage for packets to be processed by each engine and temporary storage for packets that have been processed by each engine. The individual queues operate to reduce or eliminate bottlenecks that may occur if no queues are used and the system was forced to wait for any particular ALG processing to complete.

The packet handler 206 also receives packets from the queues 210 that have been processed by the ALG engines 208. The packet handler 206 combines these packets with packets from the NAT lookup module 202 that do not require any ALG processing to form a stream of packets that flows to the NAT processing module 212. Thus, the packet handler 206 operates to perform asynchronous multi-processing to allow the ALG engines to process packets, and to form a stream of packets that is transmitted to the NAT processing module 212. The NAT processing module 212 operates to route packets to/from entities on the wireless WAN network 214. As a result, bottlenecks in the system are reduced or eliminated and CPU and battery resources are utilized more efficiently.

Figure 3:
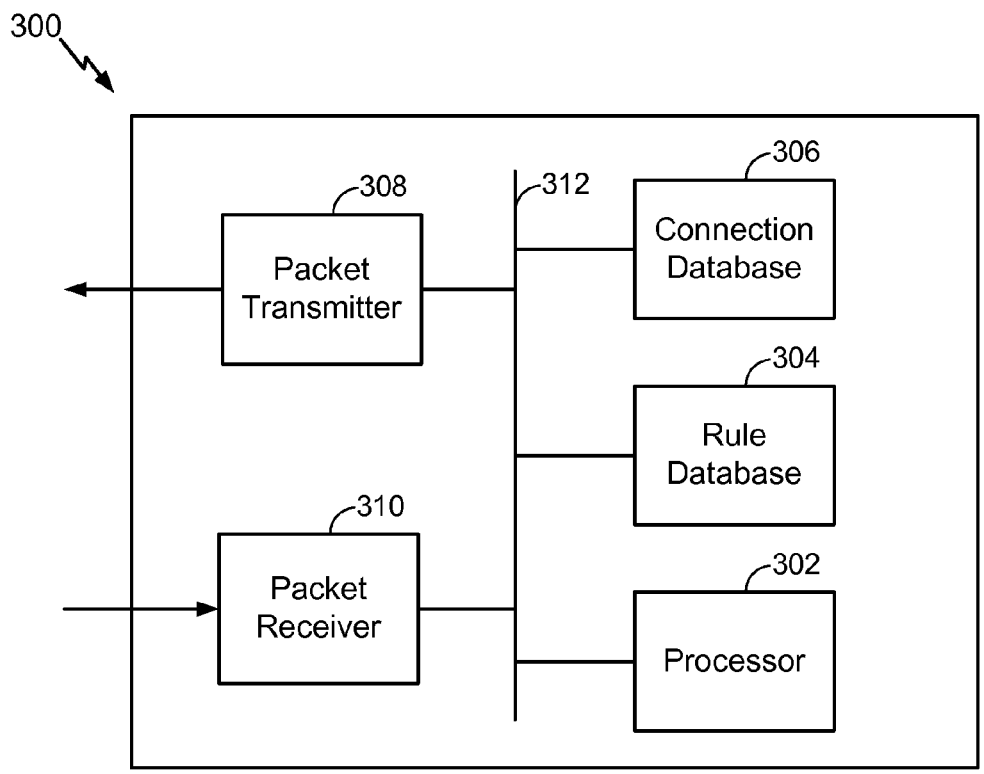
FIG. 3 shows an exemplary NAT lookup module.

FIG. 3 shows an exemplary NAT lookup module 300. For example, the NAT lookup module 300 is suitable for use at the NAT lookup module 202 shown in FIG. 2. The NAT lookup module 300 comprises processor 302, Rule database 304, Connection database 306, packet transmitter 308 and packet receiver 310 all coupled to communicate over bus 312. It should be noted that the NAT lookup module 300 is just one implementation and that other implementations are possible.

The packet receiver 310 comprises hardware and/or hardware executing software that operates to allow the NAT lookup module 300 to receive packets from a network, such as a LAN.

The Rule database 304 comprises any suitable memory or storage device that allows for storing, retrieving, and maintaining rules associated with ALG processing of received packets. For example, during an initialization process, the rules associated with each ALG engine are provided to the NAT lookup module 300 and stored in the Rule database 304. During operation, the Rule database 304 is utilized to determine the type of ALG processing required for a particular packet. Thus, the type of ALG processing can be determined for any packet that satisfies a particular set of rules.

The Connection database 306 comprises any suitable memory or storage device that allows for storing, retrieving, and maintaining associations between connection/packets and ALG processing engines. The connection database 306 is maintained by the processor 302 and is continually updated to reflect the association between the connections/packets and ALG processing engines. For example, when a first packet associated with a new connection is received, the processor 302 deep scans the packet to determine the required ALG processing and stores the association between the connection and the required ALG processing in the Connection database 306. Using the Connection database 306, the appropriate ALG engine to process any additional packets receive on that connection can be efficiently determined without having to deep scan each additional packet, therefore bypassing the deep scanning of the additional packets.

The packet transmitter 308 comprises hardware and/or hardware executing software that operates to allow the NAT lookup module 300 to transmit packets to a packet handler, such as the packet handler 206 shown in FIG. 2.

The processor 302 comprises at least one of a CPU, processor, gate array, hardware logic, memory elements, and/or hardware executing software. The processor 302 operates to control the NAT lookup module 300 to perform the functions described herein. For example, the processor 302 operates to use any appropriate interface to communicate with the ALG engines to receive rules that are stored in the Rules database 304. The processor 302 also operates to deep scan the first packet of every connection received by the packet receiver 310, and determine the type of ALG processing require for the packet from the Rules database 304. The processor 302 then updates the Connection database 306 to indicate that packets associated with that connection are to be passed to the determined ALG engine for processing. Furthermore, the processor 302 tags the packets with information from the connection database indicating the type of ALG processing, if any, to be applied to each packet. The processor 302 then controls the packet transmitter 308 to transmit the tagged packets to a packet handler, such as the packet handler 206 shown in FIG. 2. A more detailed description of the operation of the NAT lookup module 300 is provided below.

Figure 4:
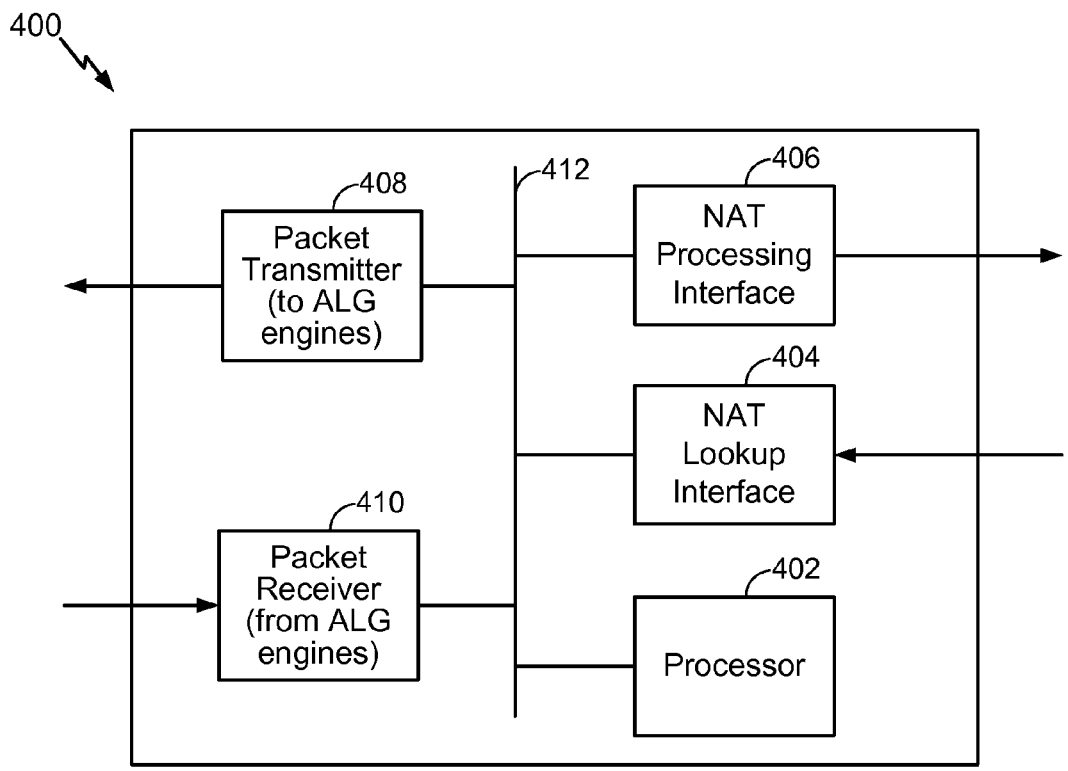
FIG. 4 shows an exemplary classification module.

FIG. 4 shows an exemplary packet handler 400. For example, the packet handler 400 is suitable for use as the packet handler 206 shown in FIG. 2. The packet handler 400 comprises processor 402, NAT lookup interface 404, NAT processing interface 406, packet transmitter 408 and packet receiver 410 all coupled to communicate over bus 412. It should be noted that the packet handler 400 is just one implementation and that other implementations are possible.

The NAT lookup interface 404 comprises at least one of a CPU, processor, gate array, hardware logic, memory elements, and/or hardware executing software. The NAT lookup interface 404 provides communication with a NAT lookup module, for example, the NAT lookup module 202 shown in FIG. 2 or the NAT lookup module 300 shown in FIG. 3. The NAT lookup interface 404 operates to receive tagged packets from the NAT lookup module. The tagged packets indicate the type of ALG processing to be performed on each packet.

The packet transmitter 408 comprises at least one of a CPU, processor, gate array, hardware logic, memory elements, and/or hardware executing software. The packet transmitter 408 provides communication with available ALG engines. For example, packets requiring ALG processing are transmitted to the appropriate queue (i.e., queues 210) associated with the desired ALG engine. Packets that enter each queue will be processed in order by the associated ALG engine.

The packet receiver 410 comprises at least one of a CPU, processor, gate array, hardware logic, memory elements, and/or hardware executing software. The packet receiver 410 provides communication with available ALG engines/queues. For example, processed packets are received from the appropriate queue (i.e., queues 210) associated with the ALG engines.

The NAT processing interface 406 comprises hardware and/or hardware executing software that operates to allow the packet handler 400 to transmit packets to a NAT processing module for further routing, such as the NAT processing module 212 shown in FIG. 2.

The processor 402 comprises at least one of a CPU, processor, gate array, hardware logic, memory elements, and/or hardware executing software. The processor 402 operates to control the packet handler 400 to perform the functions described herein. For example, the processor 402 operates to communicate with the NAT lookup module using the interface 404 to receive tagged packets for ALG processing. The processor 402 also controls the packet transmitter 408 to transmit packets to the appropriate ALG queues for processing. The processor also controls the packet receiver 410 to receive processed packets from the ALG queues, and controls the NAT processing interface 406 to transmit these processed packets to a NAT processing module. In some cases packets may be received by the interface 404 that do not require ALG processing. The processor 402 controls the NAT processing interface 406 to bypass ALG processing for these packets and transmit them to the NAT processing module. A more detailed description of the operation of the packet handler 400 is provided below.

It should be noted that although the NAT lookup module 300 and the packet handler 400 have been described as separate entities, it is also possible for these modules to be combined into a single module or entity. Furthermore, the functions of each module may be rearranged or redistributed as desired in one or more various embodiments.

Figure 5:
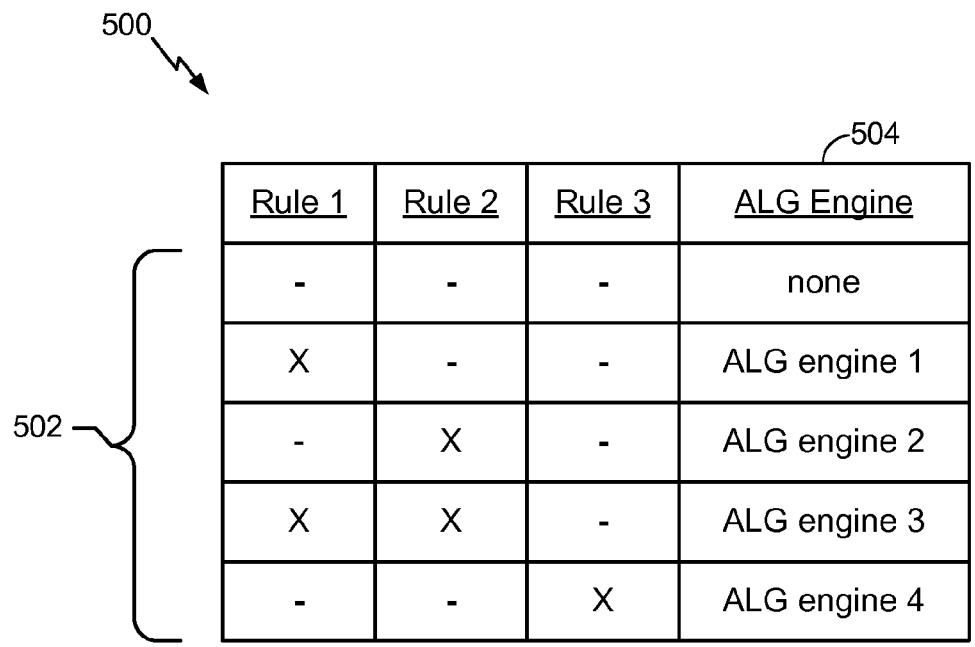
FIG. 5 shows an exemplary Rule database.

FIG. 5 shows an exemplary Rule database 500. For example, the Rule database 500 is representative of the Rule database 304 shown in FIG. 3. The rule database 500 comprises three columns (Rule1-Rule3) that identify rules, which when satisfied, identify particular packet types 502. For example, an "X" indicates that the associated rule is satisfied. Thus, a first packet type is defined which does not satisfy any rule and a fourth packet type is defined which satisfies Rule1 and Rule2 but not Rule 3. It should be noted that more or less rules may be specified and any desired combination of rules (AND, OR, NOT, etc.) can be used to classify or define any particular packet type. For example, for defining ALG processing of FTP protocol packets, the following two rules may be specified in the Rules database 500.
Rule 1 Next protocol should be TCP (AND)
Rule 2 TCP destination port 21

A fourth column 504 identifies ALG engines that are associated with and are to be used to process each packet type. It should be noted that it is possible for selected packet types to require no ALG processing. Furthermore, it is also possible that packets associated with different connections satisfy the same set of rules and are processed by the same ALG engine.

Figure 6:
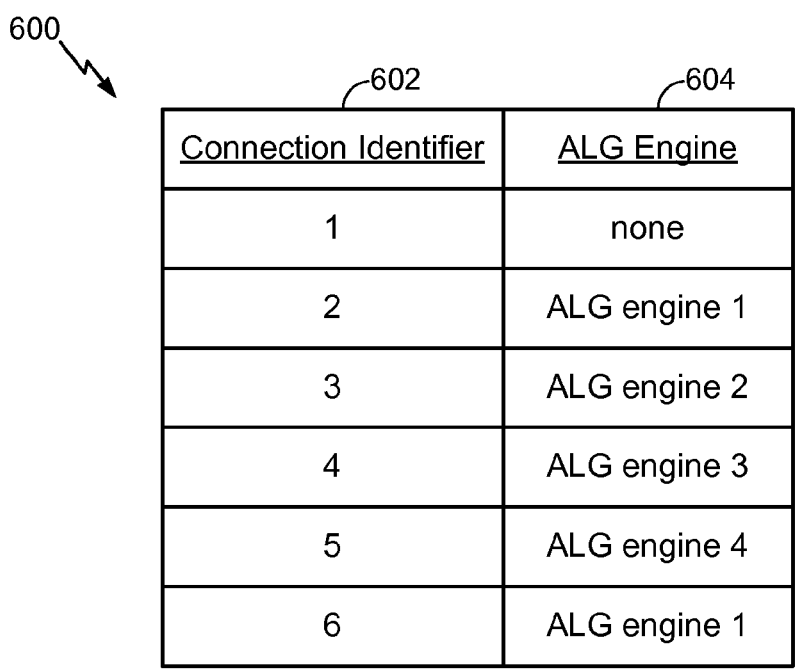
FIG. 6 shows an exemplary Connection database.

FIG. 6 shows an exemplary connection database 600. For example, the connection database 600 is representative of the connection database 306 shown in FIG. 3. The connection database 600 comprise a first column providing connection identifiers 602 and a second column providing ALG engines 604 that are associated with each connection identifier.

During operation, when the first packet of each connection is received, a new connection identifier is associated with that connection in the connection database. The first packet is then deep scanned to determine the ALG processing requirements. For example, the Rule database 500 is cross-referenced with information determined from the deep scan to determine the rules that the packet satisfies and the associated ALG engine. The determined ALG engine is then associated with the connection identifier in the Connection database 600. Thus, when additional packets of that connection are received, the Connection database 600 is accessed to efficiently determine the required ALG processing for those packets without having to deep scan each additional packet.

It should be noted that it is possible that for selected connection identifiers there are no ALG processing requirements. It is also possible that packets associated with different connections require the same ALG processing engine to process the packets. For example, in the Connection database 600, packets associated with connection 1 require no ALG processing and packets associated with connections 2 and 6 require processing by the same ALG engine (i.e., ALG engine 1).

Figure 7:
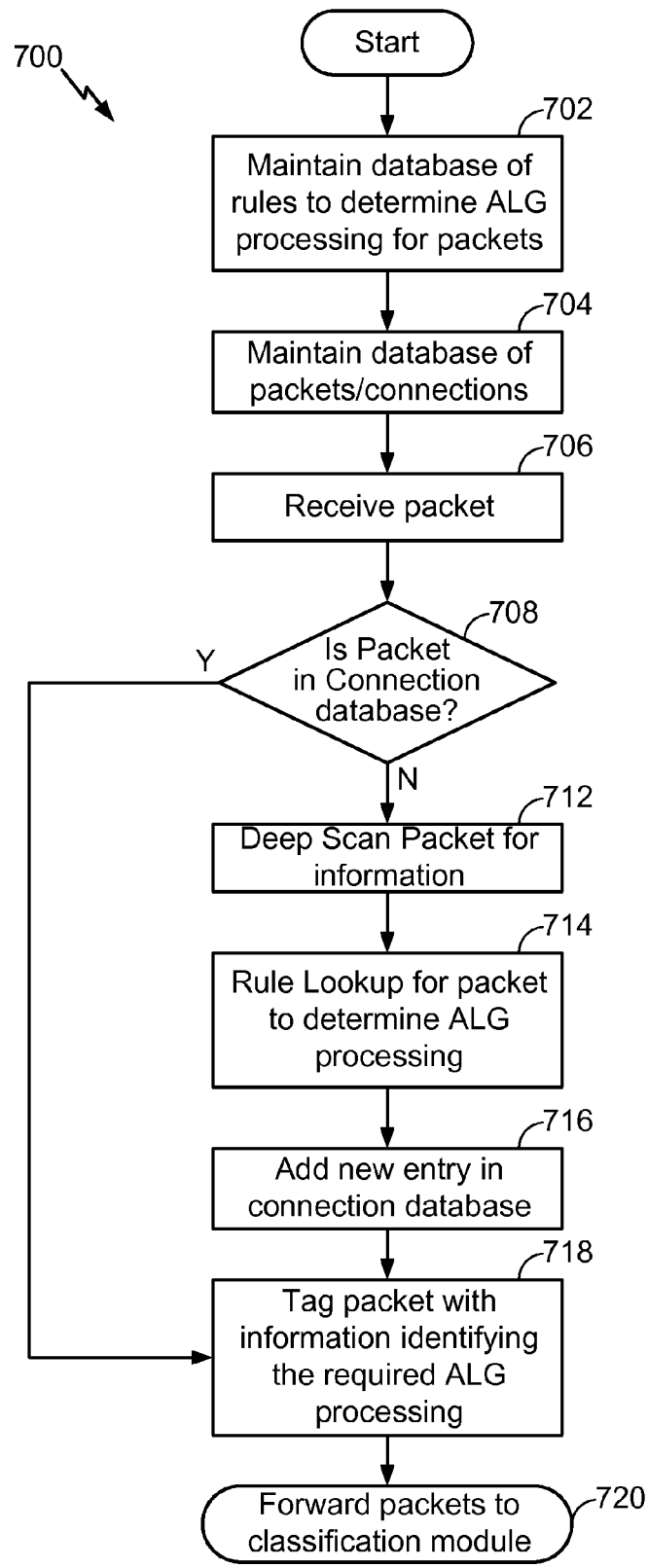
FIG. 7 illustrates an exemplary method for performing NAT processing that reduces packet scanning requirements and table lookups for ALG rules to provide increased efficiency.

FIG. 7 illustrates an exemplary method 700 for performing NAT processing that reduces packet scanning requirements and table lookups for ALG rules to provide increased efficiency. For example, the method 700 is suitable for use by the NAT lookup module 300 shown in FIG. 3. In one implementation, the processor 302 executes one or more sets of codes or instructions to control the lookup module 300 to perform the functions described below.

At block 702, a database of ALG rules is maintained. For example, the processor 302 maintains the Rule database 304 to maintain rules provided by one or more ALG engines, by user input, or other means. The rules determine which ALG engine is to be used to process packets of a particular packet type (i.e., packets that satisfy a specific set of rules). The Rule database 304 may be initialized and then continuously updated by the processor 302 as the number and/or type of ALG engines change, and as rules change.

At block 704, a database of packets/connections is maintained. For example, the processor 302 maintains the Connection database 306 to maintain the relationship between connections/packets and ALG processing to be utilized to process packets of those connections.

At block 706, a packet is received, for example, a packet is received at the NAT lookup module 202 from a LAN for routing to a WWAN. In one implementation, the packet is received by the packet receiver 310 and passed to the processor 302.

At block 708, a determination is made as to whether the received packet is associated with a connection that is identified in a Connection database. For example, the processor 302 makes this determination by evaluating a packet header or other information about the packet or connection and comparing this information with information in the Connection database 306. If the packet is associated with a connection that is not in the Connection database 306, then the packet is determined to be the first packet of a new connection and the method proceeds to block 712. If the packet is associated with a connection that is identified in the Connection database 306, then the packet is determined to be associated with an existing connection and the method proceeds to block 718.

At block 712, the received packet is deep scanned to determine information about the packet that can be cross-referenced with the Rule database 306. For example, the processor 302 deep scans the packet to determine information from its header, payload and/or other aspects of the packet to determine information about the packet that can be used to determine if the packet satisfies any of the rules in the Rule database 304. The processor 302 uses the information from the deep scan to determine which rules in the Rule database 304 are satisfied by the packet, and therefore to determine the packet type.

At block 714, a rule lookup is performed to determine the ALG processing required for the packet. Once the packet type is determined (i.e., which rules are satisfied), the processor 302 determines the required ALG processing for the packet from the Rule database 304.

At block 716, the connection database is updated. Once the ALG engine for the packet is determined, a new entry in the connection database 306 is added which identifies the connection and the associated ALG processing to be used to process packets associated with that connection. Once the Connection database 306 is updated with the new connection, further deep packet scanning of additional packets associated with that connection need not be performed for the lifetime of the connection entry. This saves processing time and bypasses deep scanning of additional packets of the connection.

At block 718, packets are tagged with information from the connection database that identifies the type of ALG processing required for each packet. For example, in one embodiment, the connection identifier and associated ALG engine identifier are added to the packet. Thus, every packet is tagged with information that identifies the required ALG processing for the packet. If no ALG processing is required, either no tag or a specific tag indicating no ALG processing is associated with the packet.

At block 720, the packet is sent for processing. For example, the processor 302 controls the packet transmitter 308 to forward the packets to a classification and asynchronous packet handler such as the packet handler 400 shown in FIG. 4.

Therefore, the method 700 operates to receive and identify packets for ALG processing without having to deep scan every packet. It should be noted that the method 700 is just one implementation and that the operations of the method 700 may be rearranged or otherwise modified such that other implementations are possible.

Figure 8:
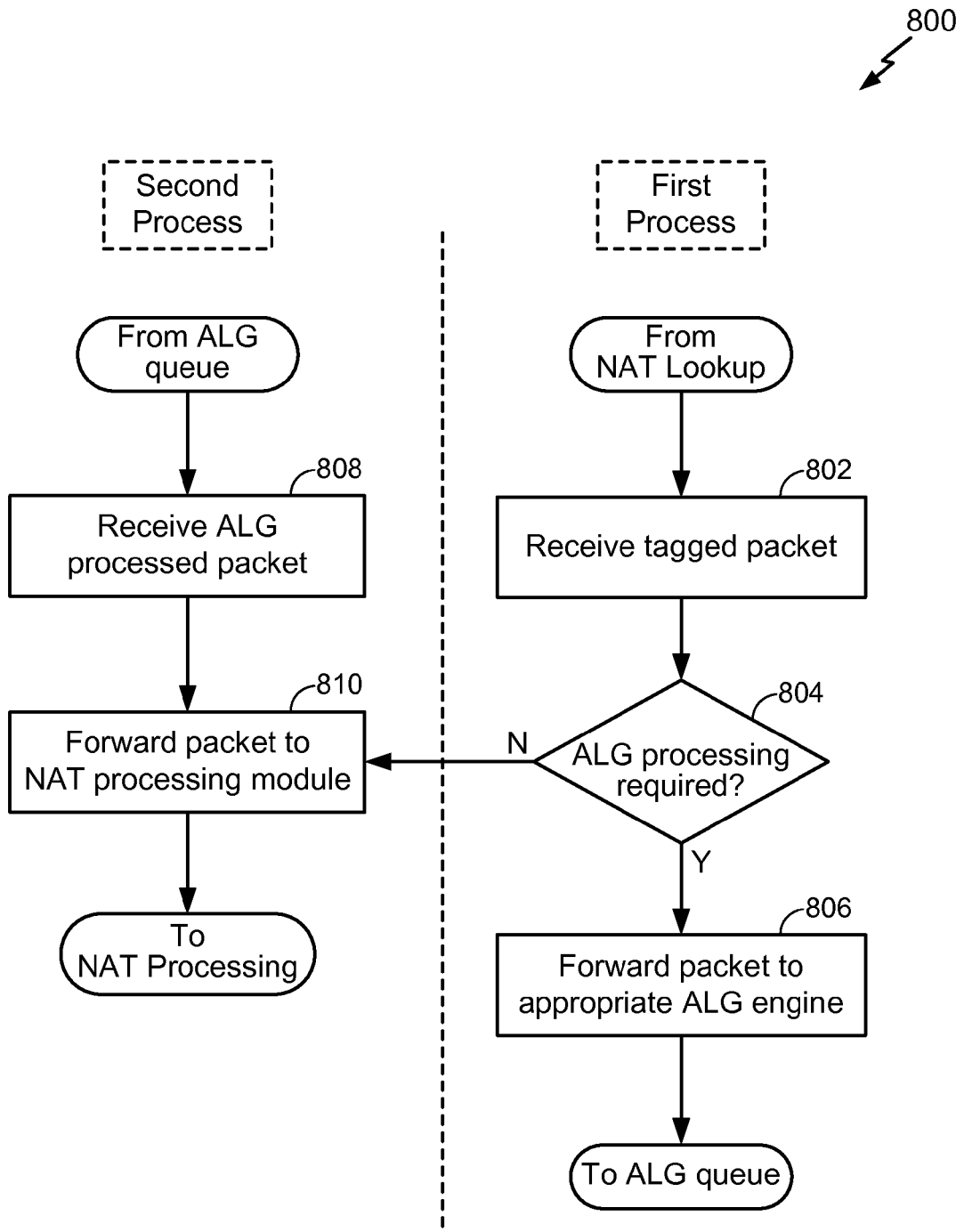
FIG. 8 shows an exemplary method for packet classification and transmission.

FIG. 8 shows an exemplary method 800 for asynchronous classification and packet handling. For clarity, the method 800 is described below with reference to the packet handler 400. For example, the method 800 provide for asynchronous parallel and multitasking ALG processing of packets. For example, two processes are shown that can be performed in parallel. These asynchronous processing provides for the following.

1. Lower RTT for packet flows as queues get processed faster, resulting in fewer chances for packet drops in the queue and increased end-to-end throughput.
2. Less CPU usage by any single task
3. As per packet processing gets divided into smaller units, the CPU efficiency increases as it can parallel process multiple tasks, increasing the idle time of the system and thus battery power consumption is reduced significantly.

In one implementation, the processor 402 executes one or more sets of codes or instructions to control the packet handler 400 to perform the functions described below.

At block 802, a first process begins by receiving a tagged packet from a NAT lookup module. For example, the tagged packet is received from the NAT lookup module 202 shown in FIG. 2 or the NAT lookup module 300 shown in FIG. 3. The packet is tagged or associated with information that indicates the type of ALG processing required for the packet. The packet may also be tagged or otherwise indicate that no ALG processing is required.

At block 804, a determination is made as to whether ALG processing is required for the received packet. For example, the processor 402 examines the packet tag to determine whether or not ALG processing is required, and if so, which type of ALG processing is required. If the packet tag indicates that no ALG processing is required, the method proceeds to block 810. If the packet tag indicates that ALG processing is required, the method proceeds to block 806.

At block 810, the packet is sent for NAT processing. For example, the packet is sent to NAT processing module 212 for further processing and routing. For example, the processor 402 controls the NAT processing interface 406 to send the packet to the NAT processing module 212.

At block 806, the packet is forwarded to the appropriate ALG engine determined from the packet's tag. In one embodiment, each ALG engine comprises input and output queues which allow the ALG engine to process packets associated with multiple connections in the order in which they are received. The use of the queues frees up NAT processing since the system does not have to pause or delay packet processing while waiting for ALG processing to complete. For example once a selected packet is input to the appropriate ALG queue, handling of additional packets can proceed while the selected packet is being processed by the ALG engine. This type of multitasking helps reduce the impact on end-to-end RTT.

The processor 402 controls the packet transmitter 408 to send the packet to the appropriate ALG engine queue. The ALG engine is notified of the packet in its receive queue and when it processes the packet it translates the packet's application payload according to the protocol definitions. After ALG processing is complete, the ALG engine puts the packet in its output queue.

A second process begins at block 808, where a processed packet is received from an ALG engine after processing. For example, the processed packet is received by the packet receiver 410 and passed to the processor 402. The method then proceeds to block 810 where the processed packet is sent for NAT processing as described above.

Therefore, the method 800 provides two processes that are performed by a packet handler. In a first process, received packets from a NAT lookup module are direct to selected ALG engines for ALG processing. In a second process, ALG processed packets and any packets not requiring ALG processing are transmitted to a NAT processing module for further processing. It should be noted that the method 800 is just one implementation and that the operations of the method 800 may be rearranged or otherwise modified such that other implementations are possible.

Figure 9:
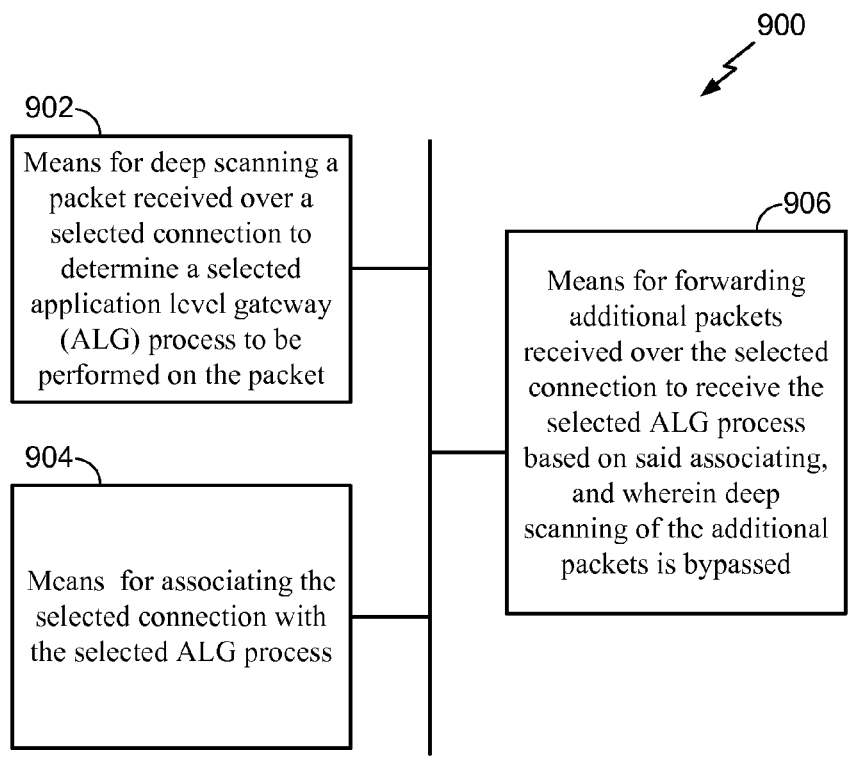
FIG. 9 shows an exemplary NAT lookup apparatus.

FIG. 9 shows an exemplary NAT lookup apparatus 900. For example, the NAT lookup apparatus 900 is suitable for use as the NAT lookup module 300 shown in FIG. 3. In an aspect, the NAT lookup apparatus 900 is implemented by at least one integrated circuit comprising one or more modules configured to provide aspects of a NAT lookup module as described herein. For example, in an aspect, each module comprises hardware and/or hardware executing software.

The NAT lookup apparatus 900 comprises a first module comprising means (902) for deep scanning a packet received over a selected connection to determine a selected application level gateway (ALG) process to be performed on the packet, which in an aspect comprises the processor 302. The NAT lookup apparatus 900 also comprises a second module comprising means (904) for associating the selected connection with the selected ALG process, which in an aspect comprises the connection database 306. The NAT lookup apparatus 900 also comprises a third module comprising means (906) for forwarding additional packets received over the selected connection to receive the selected ALG process based on said associating, and wherein deep scanning of the additional packets is bypassed, which in an aspect comprises the processor 302.

Figure 10:
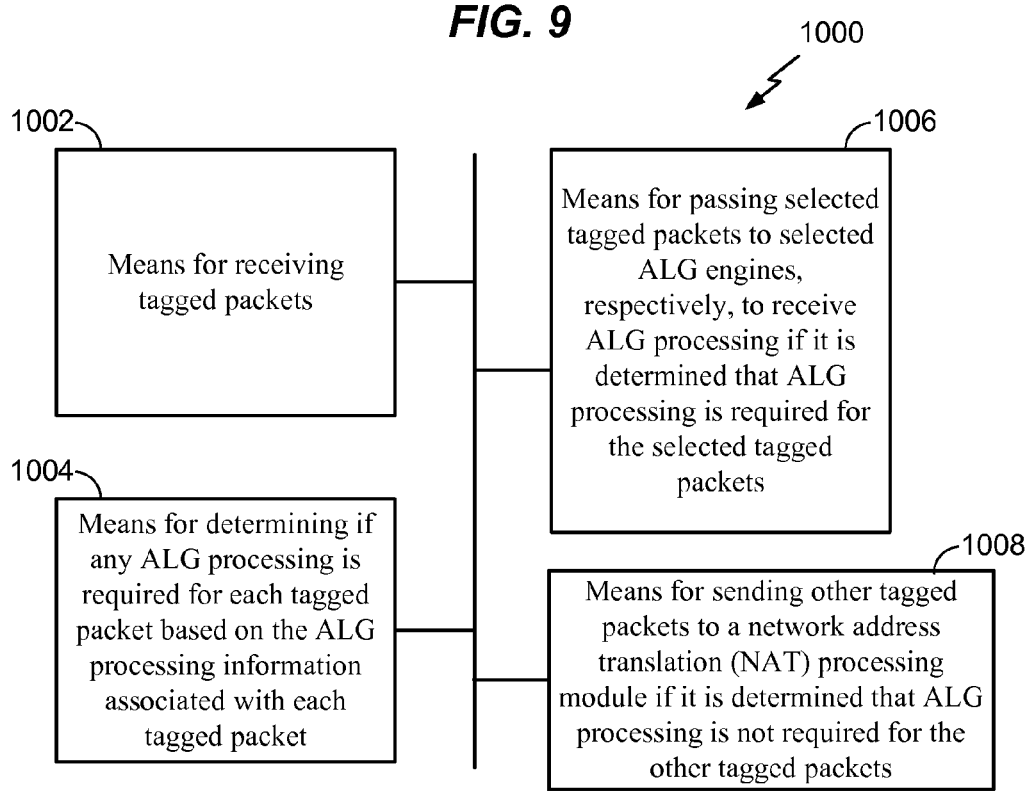
FIG. 10 shows an exemplary packet classification apparatus

FIG. 10 shows an exemplary classification apparatus 1000. For example, the classification apparatus 1000 is suitable for use as the classification module 400 shown in FIG. 4. In an aspect, the classification apparatus 1000 is implemented by at least one integrated circuit comprising one or more modules configured to provide aspects of a classification and packet handler as described herein. For example, in an aspect, each module comprises hardware and/or hardware executing software.

The classification apparatus 1000 comprises a first module comprising means (1002) for receiving tagged packets, which in an aspect comprises the NAT lookup interface 404. The classification apparatus 1000 also comprises a second module comprising means (1004) for determining if any ALG processing is required for each tagged packet based on the ALG processing information associated with each tagged packet, which in an aspect comprises the processor 402. The classification apparatus 1000 also comprises a third module comprising means (1006) for passing selected tagged packets to selected ALG engines, respectively, to receive ALG processing if it is determined that ALG processing is required for the selected tagged packets, which in an aspect comprises packet transmitter 408. The classification apparatus 1000 also comprises a fourth module comprising means (1008) for sending other tagged packets to a network address translation (NAT) processing module if it is determined that ALG processing is not required for the other tagged packets, which in an aspect comprises NAT processing interface 406.

Figure 11:
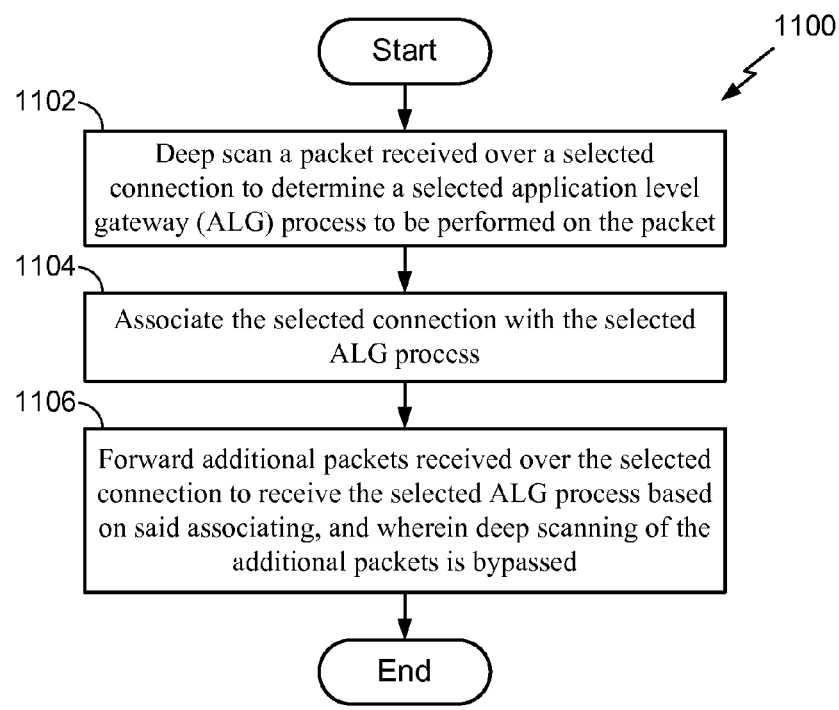
FIG. 11 illustrates an exemplary method for performing NAT processing that reduces packet scanning requirements.

FIG. 11 illustrates an exemplary method 1100 for performing NAT processing that reduces packet scanning requirements and table lookups for ALG rules to provide increased efficiency. For example, the method 1100 is suitable for use by the NAT lookup module 300 shown in FIG. 3. In one implementation, the processor 302 executes one or more sets of codes or instructions to control the lookup module 300 to perform the functions described below.

At block 1102, a packet received over a selected connection is deep scanned to determine a selected application level gateway (ALG) process to be performed on the packet. For example, the packet received is deep scanned to determine information about the packet that can be cross-referenced with the Rule database 306. For example, the processor 302 deep scans the packet to determine information from its header, payload and/or other aspects of the packet to determine information about the packet that can be used to determine if the packet satisfies any of the rules in the Rule database 304. The processor 302 uses the information from the deep scan to determine which rules in the Rule database 304 are satisfied by the packet, and therefore to determine the packet type.

At block 1104, the selected connection is associated with a selected ALG process and the connection database is updated. Once the ALG engine for the packet is determined, a new entry in the connection database 306 is added which identifies the connection and the associated ALG processing to be used to process packets associated with that connection. Once the Connection database 306 is updated with the new connection, further deep packet scanning of additional packets associated with that connection need not be performed for the lifetime of the connection entry. This saves processing time and bypasses deep scanning of additional packets of the connection.

At block 1106, additional packets received over the selected connection are forwarded to receive the selected ALG process based on the associations in the Connection database 306 so that deep scanning of the additional packets is bypassed. For example, the processor 302 controls the packet transmitter 308 to forward the packets to a classification and asynchronous packet handler such as the packet handler 400 shown in FIG. 4.

Therefore, the method 1100 operates to receive and identify packets for ALG processing without having to deep scan every packet. It should be noted that the method 1100 is just one implementation and that the operations of the method 1100 may be rearranged or otherwise modified such that other implementations are possible.

Figure 12:
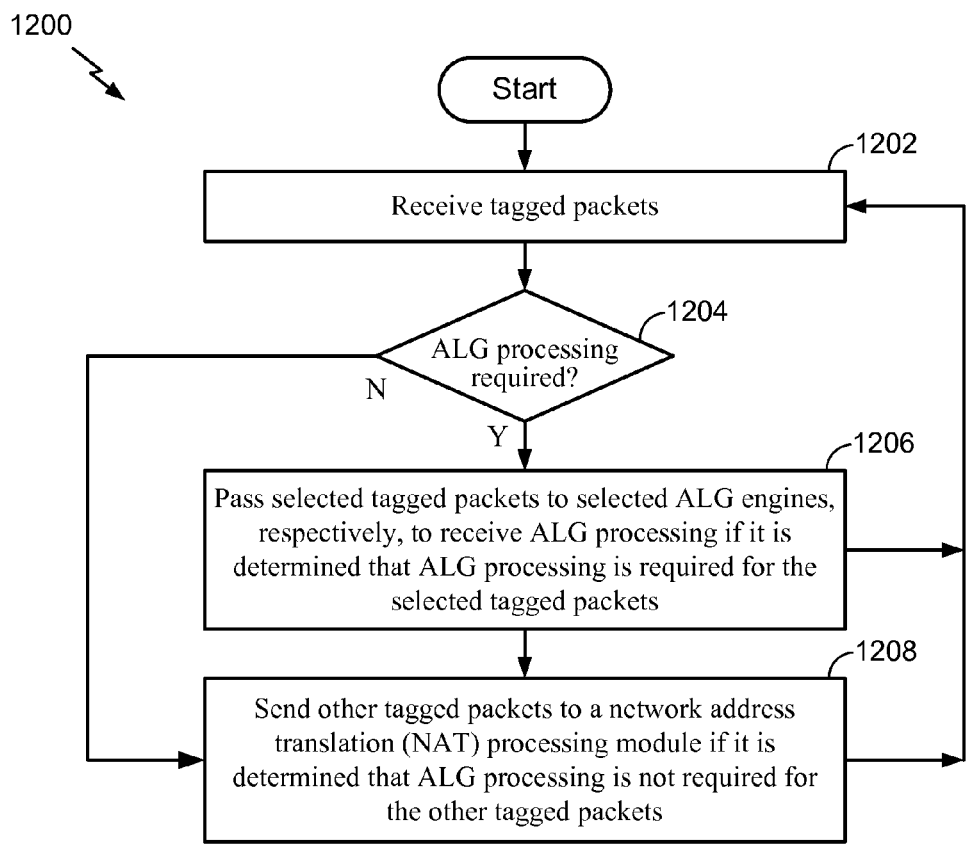
FIG. 12 shows an exemplary method for packet classification and transmission.

FIG. 12 shows an exemplary method 1200 for classification and packet handling. For clarity, the method 1200 is described below with reference to the packet handler 400. In one implementation, the processor 402 executes one or more sets of codes or instructions to control the packet handler 400 to perform the functions described below.

At block 1202, tagged packets are received from a NAT lookup module. For example, a tagged packet is received from the NAT lookup module 202 shown in FIG. 2 or the NAT lookup module 300 shown in FIG. 3. The packet is tagged or associated with information that indicates the type of ALG processing required for the packet. The packet may also be tagged or otherwise indicate that no ALG processing is required.

At block 1204, a determination is made as to whether ALG processing is required for the received packet. For example, the processor 402 examines the packet tag to determine whether or not ALG processing is required, and if so, which type of ALG processing is required. If the packet tag indicates that no ALG processing is required, the method proceeds to block 1208. If the packet tag indicates that ALG processing is required, the method proceeds to block 1206.

At block 1206, the packet is forwarded to the appropriate ALG engine determined from the packet's tag. In one embodiment, each ALG engine comprises input and output queues which allow the ALG engine to process packets associated with multiple connections in the order in which they are received. The use of the queues frees up NAT processing since the system does not have to pause or delay packet processing while waiting for ALG processing to complete. For example once a selected packet is input to the appropriate ALG queue, handling of additional packets can proceed while the selected packet is being processed by the ALG engine. This type of multitasking helps reduce the impact on end-to-end RTT.

The processor 402 controls the packet transmitter 408 to send the packet to the appropriate ALG engine queue. The ALG engine is notified of the packet in its receive queue and when it processes the packet it translates the packet's application payload according to the protocol definitions. After ALG processing is complete, the ALG engine puts the packet in its output queue.

At block 1208, the packet is sent for NAT processing. For example, it has been determined that ALG processing for the packet is not required, to the packet is sent to NAT processing module 212 for further processing and routing. For example, the processor 402 controls the NAT processing interface 406 to send the packet to the NAT processing module 212.

Therefore, the method 1200 operates to received tagged packets from a NAT lookup module. If ALG processing is required, the packets are sent to the appropriate ALG engine. If no ALG processing is required, the packets are sent directly to a NAT processing module. It should be noted that the method 1200 is just one implementation and that the operations of the method 1200 may be rearranged or otherwise modified such that other implementations are possible.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A computer storage media may be any available media that can be accessed by a computer and can also be referred to as a computer program product. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of an apparatus and methods for efficient NAT and ALG processing have been illustrated and described herein. It will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for packet routing comprising:
   deep scanning a packet received over a selected connection to determine a selected application level gateway (ALG) process to be performed on the packet;
   generating an entry in a connection database in response to said deep scanning, wherein the entry associates the selected connection with the selected ALG process;
   bypassing deep scanning of additional packets received over the selected connection based on the entry;
   tagging each of the packet and the additional packets with information to form tagged packets, and wherein the information associated with each tagged packet indicates an ALG process to be performed on the tagged packet;
   inputting selected tagged packets to selected input queues associated with selected ALG engines, respectively; and
   sending other tagged packets to a network address translation (NAT) processing module if it is determined that ALG processing is not required for the other tagged packets.

2. The method of claim 1, further comprising:
   maintaining a rule database that identifies one or more rules associated with one or more ALG processes, respectively; and
   determining which of the one or more rules are satisfied by the packet to determine the selected ALG process.

3. The method of claim 1, further comprising maintaining the connection database to associate connections with ALG processes.

4. The method of claim 1, said deep scanning comprises scanning at least one of a packet header and a packet payload to determine the selected application level gateway (ALG) process to be performed on the packet.

5. The method of claim 1, further comprising:
   receiving processed packets from the selected ALG engines; and
   forwarding the processed packets to the NAT processing module.

6. The method of claim 5, said receiving the processed packets comprises receiving the processed packets from selected output queues associated with the selected ALG engines, respectively.

7. An apparatus for packet routing comprising:
   a processor configured to deep scan a packet received over a selected connection to determine a selected application level gateway (ALG) process to be performed on the packet and to generate an entry in a connection database that associates the selected connection with the selected ALG process, the processor being further configured to bypass deep scanning of additional packets received over the selected connection based on the entry and to tag each of the packet and the additional packets with information to form tagged packets and wherein the information associated with each tagged packet indicates an ALG process to be performed on the tagged packet; and
   a packet transmitter configured to input selected tagged packets to selected input queues associated with selected ALG engines, respectively, and send other tagged packets to a network address translation (NAT) processing module if it is determined that ALG processing is not required for the other tagged packets.

8. The apparatus of claim 7, said processor configured to:
   maintain a rule database that identifies one or more rules associated with one or more ALG processes, respectively; and
   determine which of the one or more rules are satisfied by the packet to determine the selected ALG process.

9. The apparatus of claim 7, said database configured to maintain associations between connections and ALG processes.

10. The apparatus of claim 7, said processor configured to deep scan at least one of a packet header and a packet payload to determine the selected application level gateway (ALG) process to be performed on the packet.

11. The apparatus of claim 7, further comprising:
    a packet receiver configured to receive processed packets from the selected ALG engines and to send the processed packets to the NAT processing module.

12. The apparatus of claim 11, said packet receiver configured to receive the processed packets from selected output queues associated with the selected ALG engines, respectively.

13. An apparatus for packet routing comprising:
    means for deep scanning a packet received over a selected connection to determine a selected application level gateway (ALG) process to be performed on the packet;
    means for generating an entry in a connection database in response to said deep scanning, wherein the entry associates the selected connection with the selected ALG process;
    means for bypassing deep scanning of additional packets received over the selected connection based on the entry;
    means for tagging each of the packet and the additional packets with information to form tagged packets, and wherein the information associated with each tagged packet indicates an ALG process to be performed on the tagged packet;
    means for inputting selected tagged packets to selected input queues associated with selected ALG engines, respectively; and
    means for sending other tagged packets to a network address translation (NAT) processing module if it is determined that ALG processing is not required for the other tagged packets.

14. The apparatus of claim 13, further comprising:
    means for maintaining a rule database that identifies one or more rules associated with one or more ALG processes, respectively; and
    means for determining which of the one or more rules are satisfied by the packet to determine the selected ALG process.

15. The apparatus of claim 13, further comprising means for maintaining the connection database to associate connections with ALG processes.

16. The apparatus of claim 13, said means for deep scanning comprises means for deep scanning at least one of a packet header and a packet payload to determine the selected application level gateway (ALG) process to be performed on the packet.

17. The apparatus of claim 13, further comprising:
means for receiving processed packets from the selected ALG engines; and
means for forwarding the processed packets to the NAT processing module.

18. The apparatus of claim 17, said means for receiving the processed packets comprises means for receiving the processed packets from selected output queues associated with the selected ALG engines, respectively.

19. A computer program product for packet routing comprising:
a non-transitory computer-readable medium embodying instructions executable by a processor to:
deep scan a packet received over a selected connection to determine a selected application level gateway (ALG) process to be performed on the packet;
generate an entry in a connection database in response to said deep scan, wherein the entry associates the selected connection with the selected ALG process; and
bypass deep scanning of additional packets received over the selected connection based on the entry;
tag each of the packet and the additional packets with information to form tagged packets, and wherein the information associated with each tagged packet indicates an ALG process to be performed end the tagged packet;
input selected tagged packets to selected input queues associated with selected ALG engines, respectively; and
send other tagged packets to a network address translation (NAT) processing module if it is determined that ALG processing is not required for the other tagged packets.

20. The computer-readable medium of claim 19, said instructions configured to cause the processor to:
maintain a rule database that identifies one or more rules associated with one or more ALG processes, respectively; and
determine which of the one or more rules are satisfied by the packet to determine the selected ALG process.

21. The computer-readable medium of claim 19, said instructions configured to cause the processor to maintain associations between connections and ALG processes in the connection database.

22. The computer-readable medium of claim 19, said instructions configured to cause the processor to deep scan at least one of a packet header and a packet payload to determine the selected application level gateway (ALG) process to be performed on the packet.

23. The computer-readable medium of claim 19, said instructions configured to cause the processor to:
receive processed packets from the selected ALG engines; and
send the processed packets to the NAT processing module.

24. The computer-readable medium of claim 23, said instructions configured to cause the processor to receive the processed packets from selected output queues associated with the selected ALG engines, respectively.

\* \* \* \* \*